United States Patent
Shia et al.

(10) Patent No.: US 9,007,682 B2
(45) Date of Patent: Apr. 14, 2015

(54) OPTICAL AMPLIFIER CONTROLLER

(71) Applicant: Infinera Corporation, Sunnyvale, CA (US)

(72) Inventors: Brian Shia, Sunnyvale, CA (US); Yan Han, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 136 days.

(21) Appl. No.: 13/718,008

(22) Filed: Dec. 18, 2012

(65) Prior Publication Data

US 2014/0169787 A1   Jun. 19, 2014

(51) Int. Cl.
*H01S 3/09* (2006.01)
*H01S 3/13* (2006.01)
*H04B 10/293* (2013.01)
*H01S 3/067* (2006.01)
*H01S 3/094* (2006.01)
*H01S 3/10* (2006.01)

(52) U.S. Cl.
CPC ......... *H04B 10/2931* (2013.01); *H01S 3/06754* (2013.01); *H01S 3/094076* (2013.01); *H01S 3/10015* (2013.01); *H01S 3/1301* (2013.01)

(58) Field of Classification Search
USPC ................. 359/341.3, 341.31; 372/29.02, 33, 372/38.07
See application file for complete search history.

(56) References Cited

U.S. PATENT DOCUMENTS

| 6,760,152 B2 | 7/2004 | Ratoff et al. |
| 7,110,167 B2* | 9/2006 | Gurusami et al. ......... 359/341.3 |
| 7,856,037 B2 | 12/2010 | Gurusami et al. |

* cited by examiner

*Primary Examiner* — Mark Hellner
(74) *Attorney, Agent, or Firm* — Harrity & Harrity LLP; David L. Soltz

(57) ABSTRACT

A controller is configured to determine a first amount of current associated with a first power level. The controller is configured further to generate a digital pulse signal based on the first amount of current, where the digital pulse signal may have a second power level and an associated duty cycle. The controller is configured further to convert the digital pulse signal into a second amount of current and output the second amount of current as a pulse signal based on the duty cycle.

19 Claims, 5 Drawing Sheets

US 9,007,682 B2

OPTICAL AMPLIFIER CONTROLLER

BACKGROUND

Optical communication systems are systems in which optical signals are sent from a transmitter to a receiver via an optical fiber. Such systems may include a transmitter circuit, such as a transmitter (TX) photonic integrated circuit (PIC) having a transmitter component to provide a laser associated with multiple optical signals, a modulator configured to modulate the output of the laser, and a multiplexer to combine each of the modulated outputs. Such systems may also include a receiver circuit having a receiver (Rx) PIC and may be configured to receive the combined output and demultiplex the combined output into individual optical signals. Additionally, the receiver circuit may include receiver components to convert the optical signals into electrical signals, and output the data carried by those electrical signals.

Such a system may include one or more amplifiers located on the optical fiber between the transmitter and the receiver. The amplifier may be used to increase the amplitude and/or power level of a received optical signal, while maintaining the wavelength, bandwidth, polarization, and/or other phase characteristics associated with the optical signal. The amplifier may increase the amplitude and/or power of the received optical signal by using optical power from an optical pump associated with the amplifier. The optical pump may receive current from a controller and use the current to create the optical power that is used to increase the amplitude and/or power of the received optical signal.

SUMMARY

According to one example implementation, a system may include a controller, an optical pump, and an amplifier module. The controller may determine a first amount of current associated with a first power level and generate a digital pulse signal based on the first amount of current. The digital pulse signal may have a second power level and a duty cycle. The second power level may be selected by the controller based on a digital value being associated with the second power level and the duty cycle being selected by the controller based on a difference between the first power level and the second power level. The controller may convert the digital pulse signal into a second amount of current by using the digital value. The controller may output the second amount of current as a pulse signal based on the duty cycle. The optical pump may receive the second amount of current from the controller and generate optical power based on the second amount of current and the duty cycle. The amplifier module may receive an optical signal, receive the optical power from the optical pump, and may add gain, using the optical power, to the optical signal. The amplifier module may output the optical signal after adding the gain.

According to another example implementation, a method, performed by a controller, may include determining a first amount of current associated with a first power level; generating a digital pulse signal based on the first amount of current, the digital pulse signal having a second power level and an associated duty cycle; converting the digital pulse signal into a second amount of current; and outputting the second amount of current based on the duty cycle.

According to another example implementation, a system may include a controller. The controller may determine a first amount of current associated with a first power level and generate a digital pulse signal based on the first amount of current. The digital pulse signal may have a second power level and a duty cycle. The second power level may be selected by the controller based on a digital value being associated with the second power level and the duty cycle being selected by the controller based on a difference between the first power level and the second power level. The controller may further convert the digital pulse signal into a second amount of current by using the digital value. The controller may further output the second amount of current as a pulse signal based on the duty cycle.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

According to some implementations described herein, a controller, associated with an amplifier system, may generate pulse signals with configurable duty cycles that increase the controller's level of accuracy in generating an amount of current that is sent to an optical pump.

Figure 1:
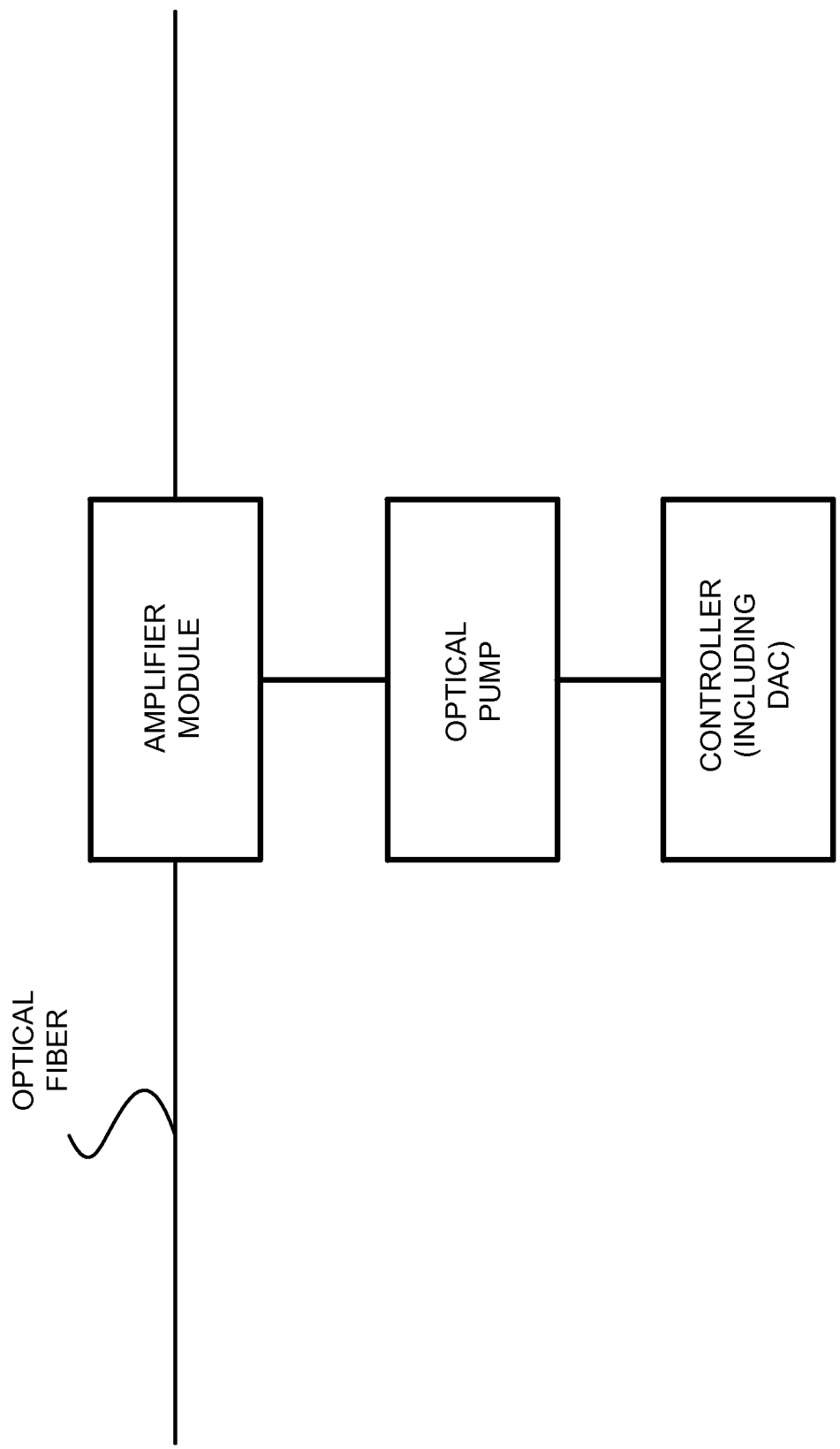
FIG. 1 is a diagram of an overview of an implementation described herein.

FIG. 1 is a diagram of an overview of an implementation described herein. FIG. 1 shows an amplifier module, an optical pump, and a controller.

Assume that the amplifier module, the optical pump, and the controller are components of an amplifier system. Assume that the amplifier system is located on an optical fiber between a transmitter and a receiver. Assume that the amplifier system is being used to add gain (e.g., measured in decibels (dB)) to an optical signal that is being transmitted, on the optical fiber, from the transmitter to the receiver.

The amplifier module may add gain to the optical signal by using optical power from the optical pump. The optical pump may be a device that receives an amount of current from the controller to generate the optical power. The controller may determine the amount of current to provide to the optical pump to achieve a particular optical power output of the optical pump.

The controller may determine the amount of current and generate a digital signal which is converted into an analog signal by using a digital-to-analog converter (referred to as a "DAC") which is a part of the controller. The digital signal may have a digital value, assigned by the controller, which is used by the DAC to convert the digital signal into an amount of current associated with the analog signal. Since there are a finite number of digital values that can be converted by the DAC and some amounts of current (e.g., current amounts that are lower than a threshold may not have their own associated digital value) do not have an associated digital value, the controller may use a pulse signal with a configurable duty cycle to send a greater amount of current that is associated with a digital value.

A duty cycle is used to activate a signal for a particular period of time. For example, a 10% duty cycle means that the controller is sending a pulse signal that has a particular value (e.g., current, voltage, power, etc.) for 10% of a period of time (e.g., 0.1 seconds out of 1 second) and for 90% of the time the controller is sending a pulse signal that has a zero value.

Thus, if the controller needs to generate a particular amount of current that does not have an associated digital value, then the controller may configure the duty cycle so that the controller may generate a digital pulse signal that is associated with a greater amount of current. For example, the controller may select an amount of current (e.g., a current amount that is greater than the particular amount of current and that has an associated digital value). The controller may configure the duty cycle based on a relationship of the selected amount of current and the particular amount of current. The DAC may, using the digital value, convert the digital pulse signal into an analog pulse signal.

However, because of the duty cycle, the controller may send (over a period of time) the particular amount of current to the optical pump. This is based on taking, over the period of time, the average value of the percentage (e.g., a 10% based on a 10% duty cycle) of the analog pulse signal that produces the selected amount of current and the remaining percentage of the analog pulse signal that produces a zero amount of current.

As a result, by generating the pulse signal, the controller may provide the correct amount of current to the optical pump so that the optical pump may generate the correct amount of optical power.

Figure 2:
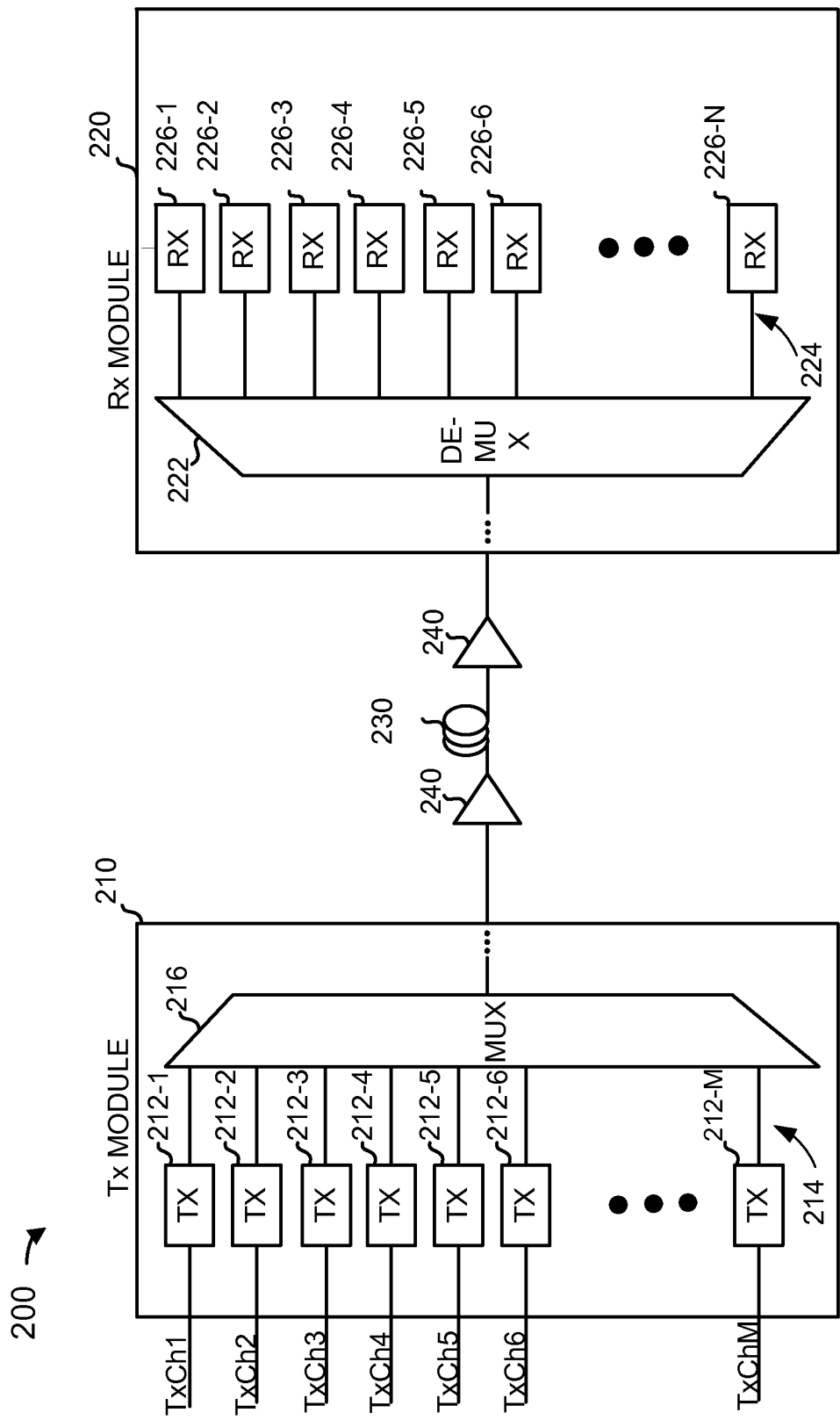
FIG. 2 is a diagram of an example network in which systems and/or methods may be implemented.

FIG. 2 is a diagram of an example network 200 in which systems and/or methods described herein may be implemented. As illustrated in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifier systems 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components.

Each optical transmitter 212 may receive data for a data channel (shown as TxCh1 through TxChM), modulate the data with an optical signal to create an output optical signal, and transmit the output optical signal. In one implementation, transmitter module 210 may include 5, 10, 20, 50, 100, or some other quantity of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super-channel.

In some implementations and as described above, each of optical transmitters 212 may include a TX digital signal processor (DSP), a DAC, a laser, a modulator, and/or some other components. The laser and/or the modulator may be coupled with a tuning element, such as a heater, that can be used to tune the wavelength of the optical signal channel.

Waveguides 214 may include an optical link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexer device. In some implementations, optical multiplexer 216 may combine multiple output optical signals, associated with optical transmitters 212, into a single optical signal (e.g., a WDM signal). A corresponding waveguide may output the WDM signal to an optical fiber, such as link 230. For example, optical multiplexer 216 may include an input (e.g., a first slab to receive input optical signals supplied by optical transmitters 212) and an output (e.g., a second slab to supply a single WDM signal associated with the input optical signals). Optical multiplexer 216 may also include waveguides connected to the input and the output.

In some implementations, the first slab and the second slab may each act as an input and an output. For example, the first slab and the second slab may each receive multiple input optical signals (e.g., output optical signals supplied by optical transmitters 212). Additionally, the first slab may supply a single WDM signal corresponding to the input optical signals (e.g., output optical signals supplied by optical transmitters 212) received by the second slab. Further, the second slab may supply a single WDM signal corresponding to the input optical signals (e.g., output optical signals supplied by optical transmitters 212) received by the first slab. In some implementations, a corresponding waveguide may output the WDM signal to an optical fiber, such as link 230.

As shown in FIG. 2, optical multiplexer 216 may receive output optical signals outputted by optical transmitters 212, and output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization. In some other implementations, there may be F (F>2) WDM signals having F different polarizations.

Link 230 may include an optical fiber. Link 230 may transport one or more optical signals associated with multiple wavelengths.

Amplifier system 240 may include a device capable of increasing an amplitude and/or power level of a received optical signal, while maintaining the wavelength, bandwidth, polarization, and/or phase characteristics, associated with the optical signal. Amplifier system 240 may receive the optical signal from transmitter module 210 and may amplify the optical signal. Amplifier system 240 may output the amplified optical signal to receiver module 220. Amplifier system 240 may equalize optical signals being sent via link 230 to prevent uneven amplification that may occur over a length of optical fiber associated with link 230.

In some implementations, amplifier system 240 may be an erbium-doped fiber amplifier (referred to as "EDFA"). An EDFA uses an erbium-doped fiber and uses an optical pump to provide the optical power to the erbium-doped fiber. In some implementations, amplifier system 240 may be associated with a semiconductor optical amplifier (referred to as "SOA"). In some implementations, amplifier system 240 may be a Raman amplifier. Amplifier system 240 is described further with regard to FIG. 3.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other demultiplexer device. Optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the first slab and the second slab.

In some implementations, the first slab and the second slab may each act as an input and an output. For example, the first slab and the second slab may each receive an optical signal (e.g., a WDM signal supplied by optical multiplexer 216 and/or some other optical signal). Additionally, the first slab may supply output optical signals corresponding to the optical signal received by the second slab. Further, the second slab may supply output optical signals corresponding to the optical signal received by the first slab. As shown in FIG. 2, optical demultiplexer 222 may supply optical signals to optical receivers 226 via waveguides 224.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, convert data, associated with the input optical signals, to voltage signals, convert the voltage signals to digital samples, and process the digital samples to produce output data corresponding to the input optical signals. Optical receivers 226 may each operate to convert the input optical signal to an electrical signal that represents the transmitted data. In some implementations, each of optical receivers 226 may include a local oscillator, a hybrid mixer, a detector, an analog-to-digital converter (ADC), an RX DSP, and/or some other components.

While FIG. 2 shows network 200 as including a particular quantity and arrangement of components, in some implementations, network 200 may include additional components, fewer components, different components, or differently arranged components. Also, in some instances, one of the components illustrated in FIG. 2 may perform a function described herein as being performed by another one of the components illustrated in FIG. 2.

Figure 3:
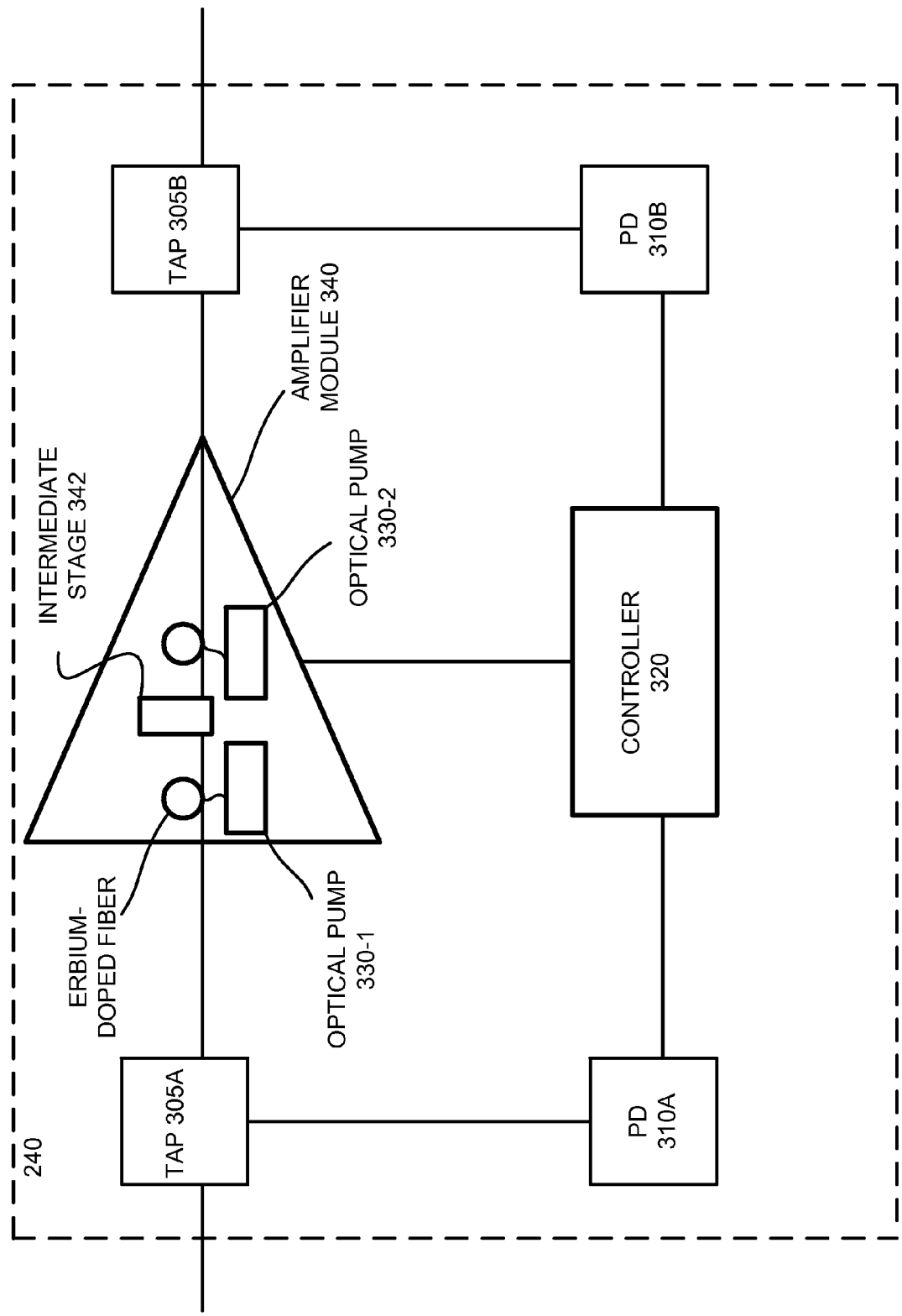
FIG. 3 is a diagram illustrating example components of an amplifier system as shown in FIG. 2.

FIG. 3 is a diagram illustrating example components of an amplifier system 240 as shown in FIG. 2. As shown in FIG. 3, amplifier system 240 may include a tap 305A, a tap 305B, a photodetector 310A (hereinafter referred to as "PD 310A"), a PD 310B, a controller 320, an optical pump 330-1, an optical pump 330-2, an amplifier module 340, and an intermediate stage 342. One of the components in FIG. 3 may perform one or more operations described as being performed by another one of the components of FIG. 3.

Tap 305A and tap 305B may include optical decoupler devices that divert a portion of the optical signal being sent from transmitter module 210 via link 230. As shown in FIG. 3, tap 305A may divert a portion (e.g., 0.5%, 1%, 2%, etc.) of the optical signal before the optical signal enters amplifier module 340 and tap 305B may divert a portion of the optical signal after the optical signal leaves amplifier module 340. Tap 305A and tap 305B may send their respective portions of the optical signal to PD 310A and PD 310B.

PD 310A and PD 310B may include photodetectors that convert optical signals into electrical signals. PD 310A may receive the portion of the optical signal from tap 305A and PD 310A may convert the portion of the optical signal into an electrical signal. PD 310B may receive the portion of the optical signal from tap 305B and PD 310B may convert the portion of the optical signal into an electrical signal. PD 310A and PD 310B may send the respective electrical signals to controller 320.

Controller 320 may include an ASIC, FPGA, processor, or the like. Controller 320 may be a device programmed to generate an amount of current that controller 320 provides to optical pump 330. Optical pump 330 may use the amount of current to generate optical power. Controller 320 may receive the electrical signals from PD 310A and PD 310B. Controller 320 may calculate the gain (being produced by amplifier system 240) by taking the ratio of the electrical signal received from PD 310B to the electrical signal received from PD 310A.

Controller 320 may compare the calculated gain to the required gain of amplifier system 240. If the calculated gain is less, or more, than the required gain, then controller 320 may adjust the amount of current being sent to optical pump 330. By adjusting the amount of current, optical pump 330 may change the amount of optical power being sent to amplifier module 340 and, thus, may change the calculated gain to the required gain associated with amplifier system 240. If the amount of optical power is to be changed, then controller 320 may determine an amount of current needed to generate the new amount of optical power. Controller 320 may send an analog pulse signal to optical pump 330. The analog pulse signal may include the amount of current that optical pump 330 may use to generate the optical power.

Because controller 320 generates digital pulse signals that are converted by a DAC (which is a part of controller 320) to analog pulse signals (which is the amount of current), controller 320 may first determine a digital pulse signal by using a field programmable gate array (hereinafter referred to as "FPGA") associated with controller 320. The FPGA may determine the power level associated with the digital pulse signal and the FPGA may determine the duty cycle of the digital pulse signal. The digital pulse signal may be assigned a digital value (e.g., a positive integer, such as 1, 5, 21, 16, etc.). The DAC may use the digital value to determine the analog pulse signal (the amount of current). The DAC may store different digital values that are assigned to different amounts of current to be used by optical pump 330 to generate different amounts of optical power. For example, assume that a digital value of 11 is associated with an amount of current used to generate 15 mW of optical power.

The FPGA may use the following example formula to determine the duty cycle and power level:

$$P(\text{effective}) = P(\text{high}) \times DC + P(\text{low}) \times (1-DC)$$

In the example formula, P(effective) may refer to the average amount of power generated, over a period of time, by optical pump 330. In the example formula, P(high) may refer to the maximum power level that can be generated by the amount of current being sent to optical pump 330. In the example formula, "DC" may refer to the duty cycle of the digital pulse signal. In the example formula, P(low) may refer to the minimum power level that can be generated by the amount of current. The P(low) value may be associated with a threshold value of optical pump 330. The threshold value may be the minimum output value of optical pump 330. Controller 320 may select the P(high) value, the P(low) value, and the duty cycle value that will result in the amount of current that will generate P(effective). Controller 320 may generate a P(effective) value so that the difference between the P(effective) value and the amount of power needed by the optical pump is less than a threshold level of error.

In some implementations, P(low) may be close to a value of zero (e.g., 0.005 mW, 0.001 mW, 0.003 mW, etc.) and the above example formula may become:

$$P(\text{effective}) = P(\text{high}) \times DC.$$

Figure 4:
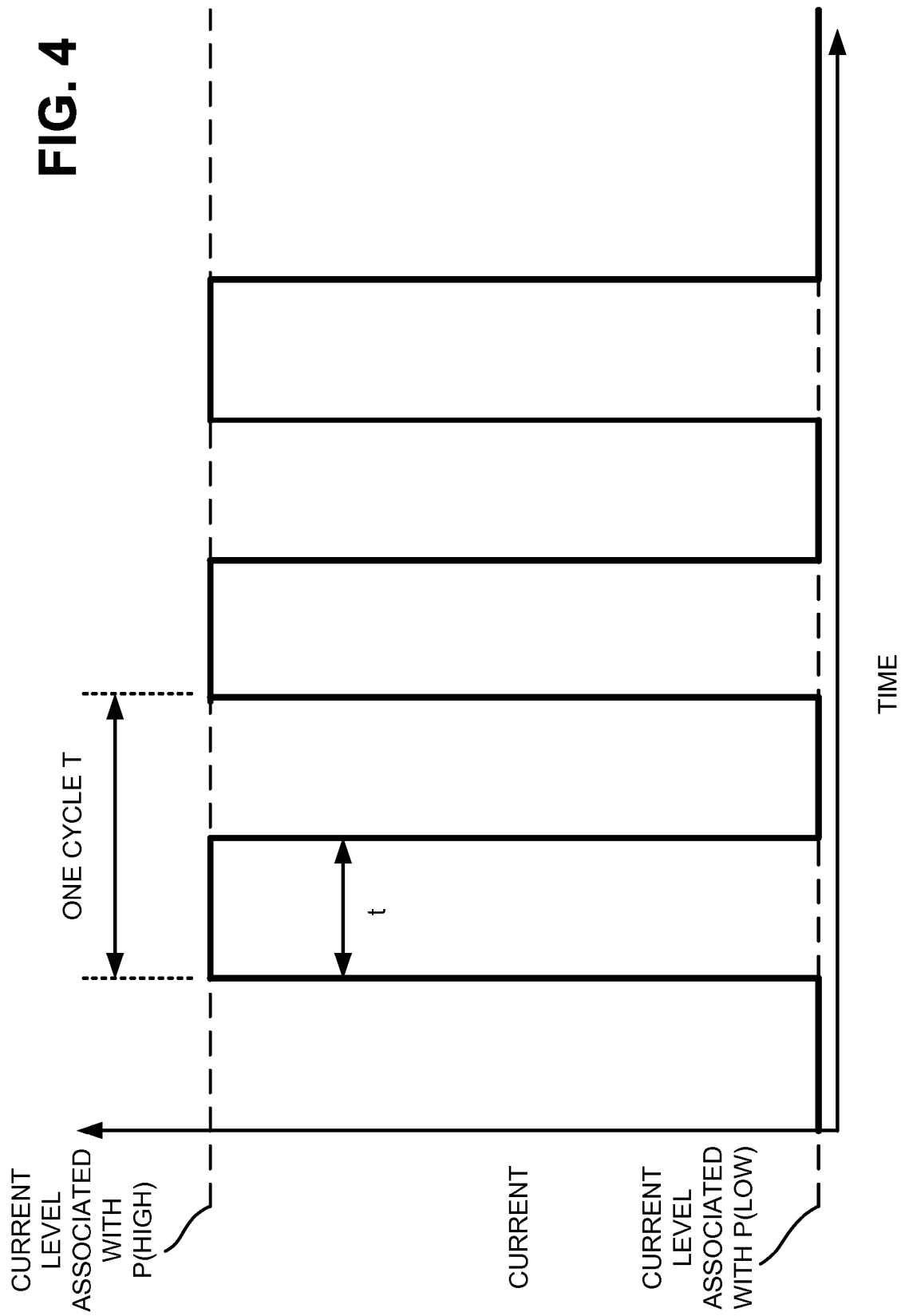
FIG. 4 illustrates an example of a graph showing a pulse signal.

FIG. 4 illustrates an example of a graph showing a digital pulse signal. As shown in FIG. 4, the digital pulse signal is associated with an amount of current that will produce a maximum amount of optical power that is equal to P(high). Further, as shown in FIG. 4, the digital pulse signal is associated with an amount of current that will produce a minimum amount of optical power that is equal to P(low). As discussed above, P(low) may be close to zero and can be approximated to zero for purposes of determining the P(effective) value. The pulse signal has a duty cycle which sends the pulse signal as a function of time. In the example described with regard to FIG. 4, the duty cycle may be the ratio of t (the time associated with one pulse) to T (the time associated with one cycle). For example, a 20% duty cycle indicates that 20% of the time the pulse signal is being sent at P(high) and that 80% of the time the pulse signal is being sent at P(low).

Returning to FIG. 3, controller 320 may determine and store different P(high) values and different duty cycles so that the P(effective) value is equal to the power requirement of optical pump 330. Controller 320 may store different P(high) values to ensure that the amount of current generated by controller 320 does not exceed a threshold level of error (e.g., 1%, 2%, 5%, etc.). Table 1 shows examples of pulse signals with different duty cycles.

TABLE 1

| Optical power to be generated by the optical pump | P(high) associated with a digital value | Duty Cycle | Optical Power Output - P (effective) |
| --- | --- | --- | --- |
| 125 µW | 1.25 mW | 10% | 125 µW |
| 540 µW | 2.7 mW | 20% | 540 µW |
| 25.1 mW | 25 mW | 100% | 25 mW |

As shown, in one example in Table 1, assume that optical pump 330 needs an amount of current to generate 125 µW of optical power. Assume that controller 320 determines that there is no digital value assigned to an amount of current associated with 125 µW of optical power, but there is a digital value assigned to an amount of current associated with 1.25 mW of optical power (P(high)). Controller 320 may determine a 10% duty cycle based on the relationship between the optical pump requirement and the P(high) value. At 10% duty cycle, the amount of current sent to optical pump 330 may result in optical pump 330 producing a P(effective) of 125 µW of optical power (since for 10% of a cycle the analog pulse signal has the P(high) value of 1.25 mW and for 90% of the cycle the analog pulse signal has the P(low) value of zero).

Controller 320 may determine the duty cycle that results in an error value that does not exceed a threshold level of error stored by controller 320 (e.g., 1%, 0.5%, 2%, etc.). For example, controller 320 may determine that there is a digital value associated with an amount of current that can be used to generate 150 µW (for the amount of current needed by the optical pump to produce 125 µW in the above example). However, if controller 320 sent the amount of current used to produce 150 µW of optical power, this would result in an error amount of 20% which exceeds the threshold level of error. By using a P(high) value of 1.25 mW and a duty cycle of 10% (as described in the above example), the P(effective) value results in a 0% error which does not exceed the threshold level of error.

In another example, as shown in Table 1, assume that controller 320 needs to generate an amount of current that is to be used by optical pump 330 to produce 25.1 mW of optical power. Assume that controller 320 determines that the closest value is 25 mW (P(high)) which results in an amount of error (0.4%) that does not exceed a threshold level of error (e.g., 1%, 2%, 0.5%, etc.). Since the amount of error is below the threshold level of error, controller 320 may send the amount of current to optical pump 330 that can generate 25 mW of optical power (P(effective)) at a 100% duty cycle. The 100% duty cycle may be chosen since the difference between P(effective) and the optical power required by the optical pump is less than the threshold level of error.

The duty cycle may increase the number of analog values that can be generated by controller 320. For example, without using a duty cycle, controller 320 may be able to generate 5,000 different analog values. With the duty cycle, such as a 10% duty cycle, controller 320 may be able to generate up to 50,000 different analog values (e.g., a 10% duty cycle may increase the capability of controller 320 by a factor of 10 based on taking the inverse value of the duty cycle). Additionally, since the duty cycle increases the number of analog values that can be generated, controller 320 may use a DAC with a lower total number of bits (e.g., using a 14-bit DAC instead of a 16-bit DAC). This may permit controller 320 to increase its accuracy without having the additional expense of upgrading controller 320 with a DAC that has a higher total number of bits.

Once the FPGA has determined the duty cycle and the P(high) value of the pulse signal, controller 320 may generate the digital pulse signal with the duty cycle and the P(high) value. The FPGA may use the DAC to convert the digital pulse signal into an analog pulse signal. The FPGA may assign a digital value to the digital pulse signal. The DAC may be an 8-bit, 14-bit, or any other size DAC. The DAC may, using the digital value, convert the digital pulse signal into the analog pulse signal. Controller 320 may send the analog pulse signal, which is the amount of current, to optical pump 330.

Optical pumps 330-1 and 330-2 (hereinafter referred to generally as "optical pumps 330" and individually as "optical pump 330") may include lasers or other components that produce optical power that is provided to amplifier module 340. The optical power may change the amount of gain and/or the power level of the optical signal being sent from transmitter module 210 to receiver module 220. Optical pump 330 may receive the analog pulse signal from controller 320 and use the analog pulse signal to generate optical power. The optical power may be generated at a particular wavelength (e.g., 980 nm, 1200 nm, 1450 nm, etc.). Optical pump 330 may send the optical power to amplifier module 340. While FIG. 3 shows two optical pumps, there may be additional or fewer optical pumps 330 within amplifier system 240. Additionally, while FIG. 3 shows the optical pumps 330 within amplifier module 340, in some implementations, the optical pumps 330 may be located external of amplifier module 340.

Amplifier module 340 may include an amplification component, such as erbium-doped fiber. Amplifier module 340 may receive the optical power from optical pump 330. The energy of the optical power may interact with Erbium ions in the optical fiber which results in the stimulated emission of photons, associated with the Erbium ions, in the optical fiber. The stimulated emission of the photons results in the Erbium ions releasing energy (at the same phase and direction as the optical signal) to the received optical signal. This may result in an increase in a level of power associated with the optical signal entering amplifier module 340. In some implementations, amplifier module 340 may include an intermediate stage 342. Intermediate stage 342 may include a filter and/or a dispersion compensating fiber (DCF). Intermediate stage 342 may be used to minimize dispersion issues occurring within the optical fiber.

While FIG. 3 shows amplifier system 240 as a including a particular quantity and arrangement of components, in some implementations, amplifier system 240 may include additional components, fewer components, different components, or differently arranged components. In some instances, one of the components illustrated in FIG. 3 may perform a function described herein as being performed by another one of the components illustrated in FIG. 3.

Figure 5:
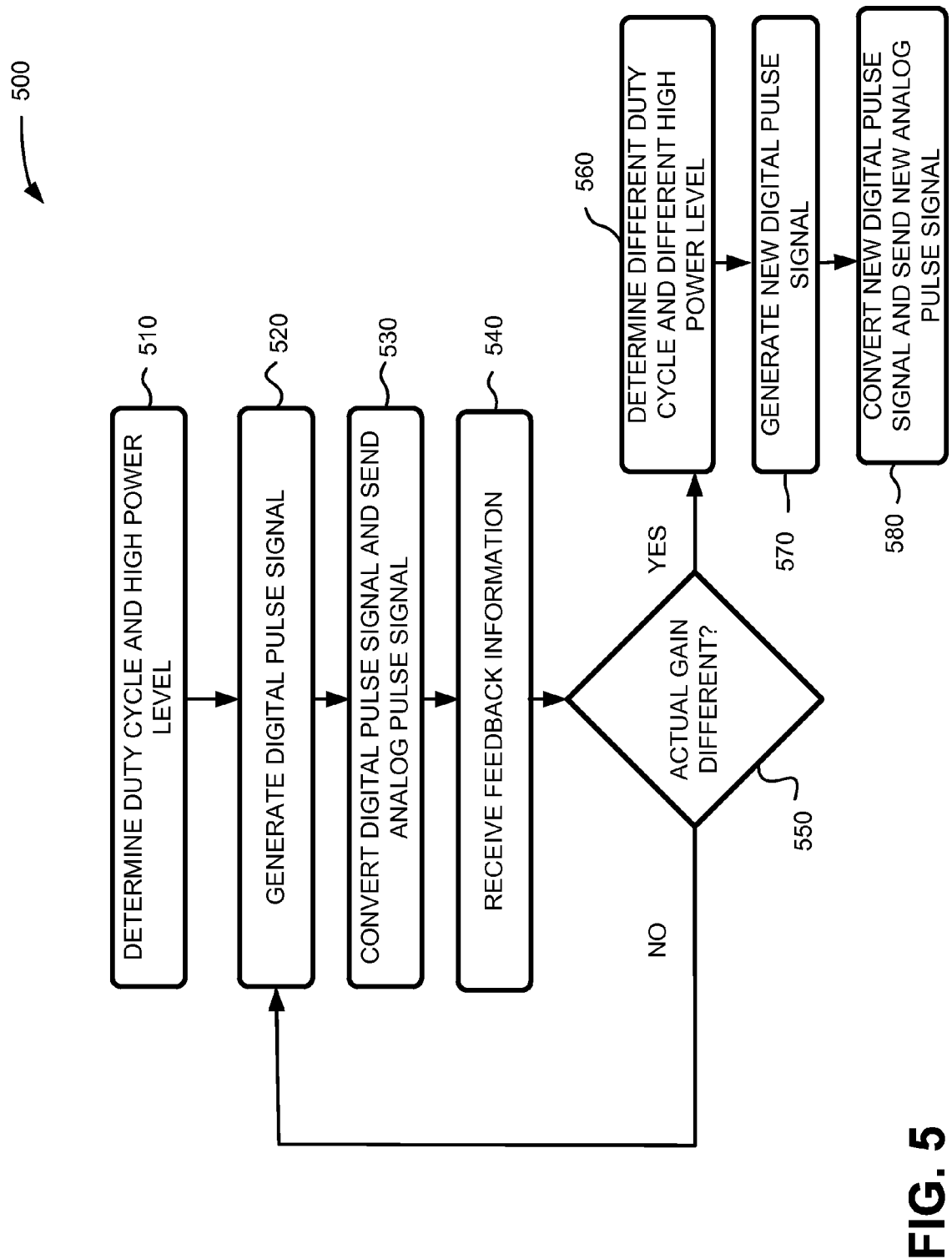
FIG. 5 is a flow chart of an example process that may be performed by a controller of FIG. 3.

FIG. 5 is a flow chart of an example process 500 that may be performed by controller 320. In some implementations, some or all of process 500 may be performed by another component of amplifier system 240, such as optical pump 330.

Process 500 may include determining a duty cycle and a high power level (block 510). For example, amplifier system 240 may be installed on link 230 (described with regard to FIG. 2). Amplifier system 240 may be configured to provide a particular amount of gain to an optical signal received by amplifier system 240. Amplifier system 240 may use optical pump 330 to generate optical power that is sent to amplifier module 340 to produce the particular amount of gain. Controller 320 may be programmed to generate an amount of current to optical pump 330 so that optical pump 330 can generate the optical power.

Controller 320 may determine a duty cycle based on the amount of current needed by optical pump 330 to generate the optical power. Controller 320 may use a FPGA to determine the high power level (P(high)) associated with a pulse signal and the duty cycle, described with regard to FIG. 3. The FPGA may determine the high power level and the duty cycle so that controller 320 may send the correct amount of current to optical pump 330 (described with regard to FIG. 3).

Process 500 may include generating a digital pulse signal (block 520). For example, controller 320 may generate a digital pulse signal based on the duty cycle and the P(high) value, as described with regard to FIG. 3.

Process 500 may include converting the digital pulse signal and sending an analog pulse signal (block 530). For example, controller 320 may use a DAC to convert the digital pulse signal into an analog pulse signal. Controller 320 may send the analog pulse signal to optical pump 330, described with regard to FIG. 3. Optical pump 330 may use the average values of the analog pulse signals, sent over a period of time (described with regard to FIG. 3), to generate the amount of optical power.

Process 500 may include receiving feedback information (block 540). For example, controller 320 may receive feedback information associated with the optical signal entering and exiting amplifier module 340, as described with regard to FIG. 3. As described with regard to FIG. 3, the feedback information may be obtained by using taps (e.g., tap 305A and tap 305B) and photodetectors (e.g., PD 310A and PD 310B). Controller 320 may use the feedback information to determine whether the actual gain associated with the optical signal is the same as the required gain that amplifier system 240 is configured to add to the optical signal.

If the actual gain is not different (block 550—NO), then process 500 may include generating the digital pulse signal (block 520). For example, controller 320 may continue to generate the digital pulse signal described with regard to block 520.

If the actual gain is different (block 550—YES), then process 500 may include determining a different duty cycle and a different high power level (block 560). Controller 320 may use the FPGA to determine the different duty cycle and the different high power level so that optical pump 330 may generate the optical power (based on the pulse signal) and may send the optical power to amplifier module 340 to achieve the required gain. The FPGA may determine the different duty cycle and the different high power level in a manner similar to determining the duty cycle and the high power level described with regard to FIG. 3 and block 510.

Process 500 may include generating a new digital pulse signal (block 570). For example, controller 320 may generate a new digital pulse signal based on the different duty cycle and the different high power level. As described with regard to FIG. 3, controller 320 may generate the new digital pulse signal to minimize or eliminate any errors associated with the amount of current sent to optical pump 330.

Process 500 may include converting the new digital pulse signal and sending a new analog pulse signal (block 580). For example, controller 320 may convert the new digital pulse signal to a new analog pulse signal (using a DAC, described with regard to FIG. 3) and send the new analog pulse signal to optical pump 330 so that optical pump 330 may derive optical power to send to amplifier module 340 to achieve the desired gain.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system comprising:
a controller configured to:
   determine a first amount of current associated with a first power level,
      generate a digital pulse signal based on the first amount of current,
   the digital pulse signal having a second power level and an associated duty cycle,
   the second power level being selected by the controller based on a digital value being associated with the second power level, and
   the duty cycle being selected by the controller based on a difference between the second power level and the first power level,
      convert the digital pulse signal, using the digital value, into a second amount of current, and
      output the second amount of current as a pulse signal based on the duty cycle;
an optical pump configured to:
   receive the second amount of current from the controller, and
   generate optical power, associated with the first power level, based on the second amount of current and the duty cycle; and
an amplifier module configured to:
   receive an optical signal,
   receive the optical power from the optical pump,
   add gain, using the optical power, to the optical signal, and
output the optical signal after adding the gain,
where the duty cycle is a first duty cycle, and
where the controller is further configured to:
   receive feedback information;
   determine, based on the feedback information, that the optical pump requires a third amount of current associated with a third power level;
   generate a second digital pulse signal based on the feedback information, the second digital pulse signal having a fourth power level and an associated second duty cycle, the fourth power level being different than the third power level and the second duty cycle being different than the first duty cycle;
   convert the second digital pulse signal into a fourth amount of current; and
   output the fourth amount of current as a pulse signal based on the second duty cycle.

2. The system of claim 1, where the controller includes a field programmable gate array, the
field programmable gate array being configured to determine the second power level and the duty cycle associated with the digital pulse signal.

3. The system of claim 1, where the controller is configured to determine the second power
level and the duty cycle so that an amount of error, associated with the second amount of current, is less than a threshold.

4. The system of claim 1, where the controller includes a digital-to-analog converter, the
digital-to-analog converter being configured to convert the digital pulse signal into the second amount of current.

5. The system of claim 1, where the controller sets the second power level equal to the first power level when the difference between the first power level and the second power level is less than a threshold.

6. The system of claim 1, where the feedback information is based on a ratio of a first amount of energy associated with the optical signal received by the amplifier module and a second amount of energy associated with the optical signal outputted by the amplifier module.

7. The system of claim 1, where the first duty cycle is larger than the second duty cycle when the difference between the first power level and the second power level is smaller than a difference between the third power level and the fourth power level.

8. A method comprising:
determining, by a controller, a first amount of current associated with a first power level;
generating, by the controller, a digital pulse signal based on the first amount of current,
the digital pulse signal having a second power level and an associated duty cycle, the second power level being selected based on a digital value being associated with the second power level, and the duty cycle being selected based on a difference between the first power level and the second power level;
converting, by the controller, the digital pulse signal into a second amount of current;
outputting, by the controller, the second amount of current based on the duty cycle; and
receiving information regarding an amount of gain being produced by an optical amplifier;
comparing the amount of gain with a required amount of gain which the optical amplifier is to produce;
determining that the amount of gain is less than the required amount of gain;
determining that an optical pump is to increase an amount of optical power so that the optical amplifier produces the amount of gain that is equal to the required amount of gain;
generating a third amount of current based on determining that the optical pump is to increase the amount of optical power, the third amount of current being used by the optical pump to increase the amount of optical power so that the amount of gain is equal to the required amount of gain; and
outputting the third amount of current to the optical pump.

9. The method of claim 8, where outputting the second amount of current includes:
outputting the second amount of current as a pulse signal based on the duty cycle.

10. The method of claim 8, further comprising:
setting the first power level to the second power level when the difference between the first power level and the second power level is less than a threshold.

11. The method of claim 8, where outputting the third amount of current to the optical pump includes:
outputting the third amount of current to the optical pump as a pulse signal.

12. The method of claim 8, where generating the third amount of current includes:
determining a third power level for the third amount of current so that the third amount of current is used by the optical pump to increase the amount of optical power sent to the optical amplifier so that the optical amplifier produces the amount of gain that is equal to the required amount of gain.

13. The method of claim 8, where the controller includes a field programmable gate array, and where the method further comprises:
determining, by the field programmable gate array, the second power level and the duty cycle.

14. The method of claim 8, where the controller includes a digital-to-analog converter, and where the method further comprises:
converting, by the digital-to-analog converter, the digital pulse signal into the second amount of current.

15. An amplifier device comprising:
a controller configured to:
determine a first amount of current associated with a first power level;
generate a digital pulse signal based on the first amount of current,
the digital pulse signal having a second power level and an associated duty cycle, the second power level being selected by the controller based on a digital value being associated with the second power level, and the duty cycle being selected by the controller based on a difference between the first power level and the second power level;
convert the digital pulse signal into a second amount of current by using the digital value; and
output the second amount of current as a pulse signal based on the duty cycle,
where the amplifier device further includes an optical pump,
where the duty cycle is a first duty cycle, and
where the controller is further configured to:
receive feedback information;
determine, based on the feedback information, that the optical pump requires a third amount of current associated with a third power level;
generate a second digital pulse signal based on the feedback information, the second digital pulse signal having a fourth power level and a second duty cycle, the fourth power level being different than the third power level and the second duty cycle being different than the first duty cycle;
convert the second digital pulse signal into a fourth amount of current; and
output the fourth amount of current to the optical pump as a pulse signal based on the second duty cycle.

16. The amplifier device of claim 15, where the controller is configured to determine the
second power level and the duty cycle so that an amount of error, associated with the second amount of current, is less than a threshold.

17. The amplifier device of claim 15, where the first duty cycle is larger than the second
duty cycle when the difference between the first power level and the second power level is smaller than a difference between the third power level and the fourth power level.

18. A system comprising:
a controller configured to:
determine a first amount of current associated with a first power level,
generate a digital pulse signal based on the first amount of current,
the digital pulse signal having a second power level and an associated duty cycle, the second power level being selected by the controller based on a digital value being associated with the second power level, and the duty cycle being selected by the controller based on a difference between the second power level and the first power level,
convert the digital pulse signal, using the digital value, into a second amount of current, and
output the second amount of current as a pulse signal based on the duty cycle;
an optical pump configured to:
receive the second amount of current from the controller, and
generate optical power, associated with the first power level, based on the second amount of current and the duty cycle; and
an amplifier module configured to:
receive an optical signal,
receive the optical power from the optical pump,
add gain, using the optical power, to the optical signal, and output the optical signal after adding the gain,
where the controller sets the second power level equal to the first power level when the difference between the first power level and the second power level is less than a threshold.

19. A method comprising:
determining, by a controller, a first amount of current associated with a first power level;
generating, by the controller, a digital pulse signal based on the first amount of current, the digital pulse signal having a second power level and an associated duty cycle, the second power level being selected based on a digital value being associated with the second power level, and the duty cycle being selected based on a difference between the first power level and the second power level;
converting, by the controller, the digital pulse signal into a second amount of current;
outputting, by the controller, the second amount of current based on the duty cycle; and
setting the first power level to the second power level when the difference between the first power level and the second power level is less than a threshold.

\* \* \* \* \*